July 15, 1969    W. E. MEINKE    3,455,207
MACHINE TOOL

Filed March 28, 1966    4 Sheets-Sheet 1

INVENTOR
WILBUR E. MEINKE

BY *Hoffmann and Yount*

ATTORNEYS

July 15, 1969  W. E. MEINKE  3,455,207
MACHINE TOOL
Filed March 28, 1966  4 Sheets-Sheet 3

INVENTOR
WILBUR E. MEINKE
BY Hoffmann and Yount
ATTORNEYS

July 15, 1969  W. E. MEINKE  3,455,207

MACHINE TOOL

Filed March 28, 1966  4 Sheets-Sheet 4

INVENTOR.
WILBUR E. MEINKE
BY
*Hoffmann and Yount*
ATTORNEYS

United States Patent Office 3,455,207
Patented July 15, 1969

1

3,455,207
MACHINE TOOL
Wilbur E. Meinke, Fairview Park, Ohio, assignor to The
New Britain Machine Company, New Britain, Conn.,
a corporation of Connecticut
Filed Mar. 28, 1966, Ser. No. 537,959
Int. Cl. B23c 1/16; B23b 39/10, 47/18
U.S. Cl. 90—14                                    3 Claims

ABSTRACT OF THE DISCLOSURE

In a machine tool, an axially extendible, rotatable tool spindle carried by a spindle head, spindle supporting sleeve means carried by the spindle head, the sleeve means being extendible relative to the head for preventing deflection of the spindle when the latter is moved to an extended working position; and power drive means for rotating the spindle, the power drive means being operatively connected to the spindle between its ends.

---

The present invention relates to machine tools, and more particularly to a machine tool having a tool spindle supported for both rotational and axial movements.

The principal object of the present invention is to provide a new and improved machine tool having an axially extendible tool spindle rotatably carried by nonrotatable means also extendible for preventing deflection of the spindle when the latter is moved to an extended working position whereby inaccuracies when machining a workpiece due to deflection of the overhanging portion of the spindle are eliminated or substantially eliminated.

Another object of the present invention is to provide a new and improved machine tool having a tool spindle supported for both rotational and axial movements and means for rotatably supporting the spindle which comprises a double sleeve arrangement including an inner sleeve which slidably supports the spindle for axial movement relative thereto and which is drivingly connected to the spindle to rotate the same and an outer sleeve which rotatably supports the inner sleeve in a manner preventing relative endwise movement therebetween, and wherein the sleeves are extendible as a unit to surround and support the tool spindle to prevent deflection of the spindle when it is moved to an outer extended working position whereby inaccuracies when machining a workpiece due to a deflection of the outwardly extending portion of the spindle are eliminated or substantially eliminated.

Another object of the present invention is to provide a new and improved machine tool, of the character defined in the preceding objects, and including means for clamping the spindle support means or outer sleeve to its support to prevent movement therebetween during the machining operation.

The present invention resides in certain novel constructions, combinations and arrangement of parts and further objects and advantages thereof will be apparent to those skilled in the art to which the invention relates from the following description of the preferred embodiment thereof described with reference to the accompanying drawings, in which similar reference characters designate corresponding parts throughout the several views, and in which:

2

FIG. 7 is an enlarged fragmentary sectional view of part of the machine shown in FIGS. 2 and 3.

Figure 1:
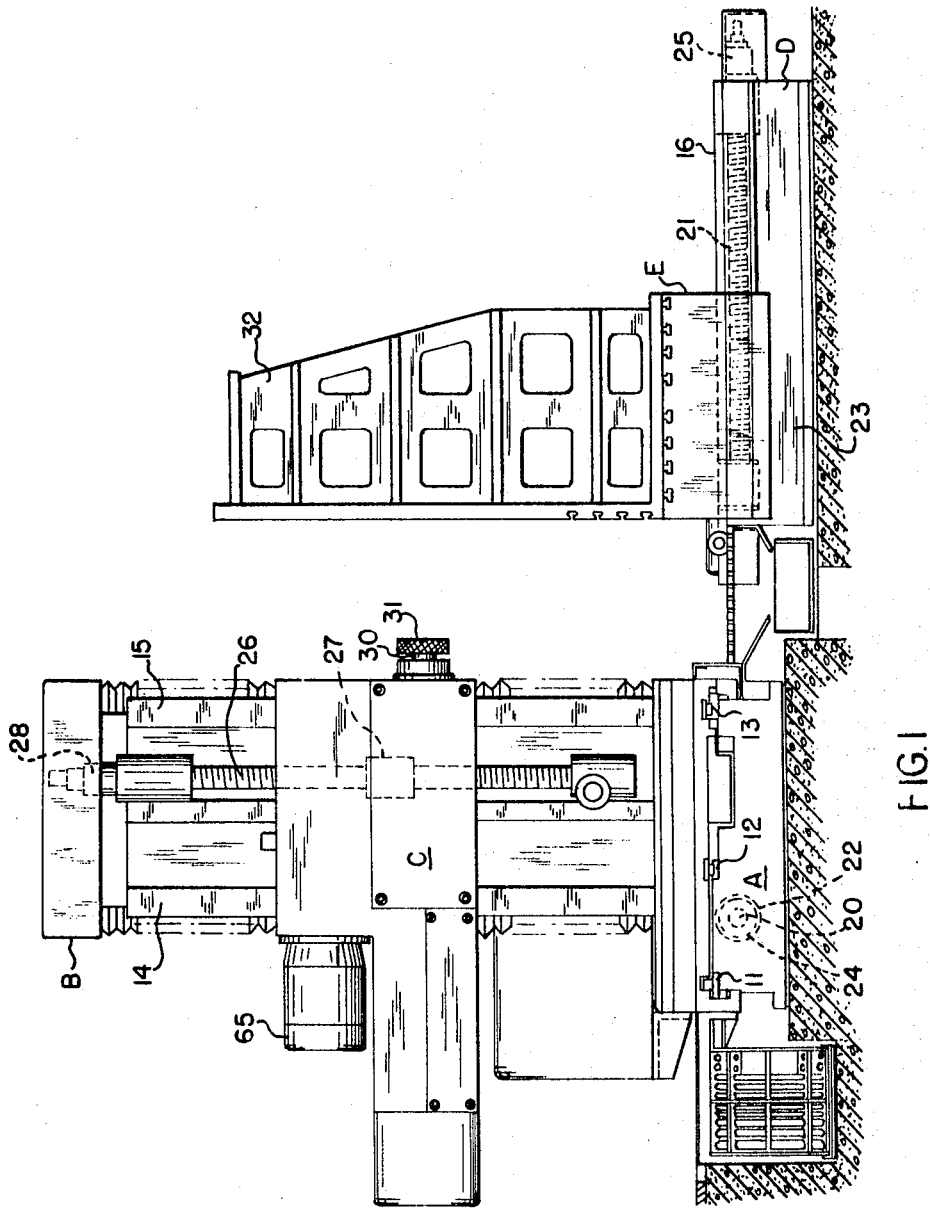
FIG. 1 is a side elevational view of a milling machine embodying the present invention.

The present invention may be embodied in various kinds of machine tools, but for the purposes of illustration is herein shown and described as embodied in a horizontal milling machine. Referring to the drawings, the milling machine shown therein comprises a bed A provided with upstanding ways 11, 12 and 13 upon which a column B is slidably supported for movement lengthwise of the bed. The column B is formed or provided with vertical ways 14 and 15 upon which a spindle head C is mounted for vertical movement. The milling machine further comprises a bed D adjacent the bed A and provided with a plurality of upstanding ways 16 (only one of which is shown in the drawings) extending perpendicularly to the ways 11–13 of the bed A and upon which a work supporting table E is slidably supported for movement toward and from the column B.

The column B and the table E are adapted to be moved horizontally along their respective ways by lead screws 20 and 21 rotatably supported at their opposite ends by the beds A and D and in threaded engagement with nuts 22 and 23 fixed to the column B and the table E, respectively. The lead screws 20 and 21 are adapted to be rotated to cause the column B and the table E to be moved in feed or rapid traverse movements relative to their respective beds A and D by conventional or suitable reversible hydraulic motors 24 and 25 operatively connected with one end of the lead screws 20 and 21, respectively.

The spindle head C is adapted to be moved vertically along the ways 14 and 15 by a lead screw 26 rotatably supported at its opposite ends in the column B in any suitable manner and in threaded engagement with a nut 27 fixed to the spindle head C. The lead screw 26 is adapted to be rotated to cause the spindle head C to be moved vertically along the ways 14 and 15 relative to the column B in any conventional manner. In the embodiment shown, it is adapted to be rotated by a conventional or suitable reversible hydraulic motor 28 mounted on the column B and operatively connected with the upper end of the lead screw 26.

The spindle head C carries a rotatable tool spindle 30 to which a tool 31, here shown as a milling cutter, is adapted to be mounted or attached for performing work on a workpiece 32 mounted on the table E. The tool spindle 30 is rotatable about its longitudinal axis in opposite directions and is movable axially or longitudinally of its axis of rotation relative to the spindle head C for positioning the tool 31 carried at its outer end in a desired working position.

In accordance with the provisions of the present invention, a novel support means 34 is provided for rotatably supporting the spindle 30 and which is extendible to support the spindle to eliminate or substantially eliminate deflection of the latter when in an extended position, due to the weight of its overhanging portion, etc. The support means 34, in the preferred embodiment, comprises a double spindle sleeve or quill arrangement having a nonrotatable outer sleeve or quill 35 slidably supported by the spindle head C for movement relative thereto longitudinally of the axis of rotation of the spindle 30 and an inner coaxial or concentric sleeve or quill 36 rotatably supported within the outer sleeve 35 and in a manner which prevents relative axial movement therebetween. The inner sleeve 36 is drivingly connected with the spindle 30 and slidably supports the latter for axial or longitudinal movement relative thereto.

The inner spindle sleeve 36 is rotatably supported in the outer spindle sleeve 35 by a plurality of tapered roller bearings 40, 41, 42 and 43 positioned therebetween at axially spaced locations therealong. Disposed between the bearings 40 and 41, both of which are double bearings, is an annular external ring gear 45 keyed to the inner sleeve 36, and disposed between the bearings 41 and 42 and 42 and 43 are spacer sleeves 46 and 47, respectively. The bearings 40, 41, 42 and 43 and the ring gear 45 and the sleeves 46 and 47 are retained in their respective positions, as viewed in FIGS. 2 or 3, by an annular radially outwardly extending shoulder or abutment 48 on the spindle sleeve 36 at its forward end which engages the inner race of the bearing 43 and by a retainer ring 49 threadably connected with the rearward end of the spindle sleeve 36 and which engages the rearwardmost bearing 40.

Figure 2:
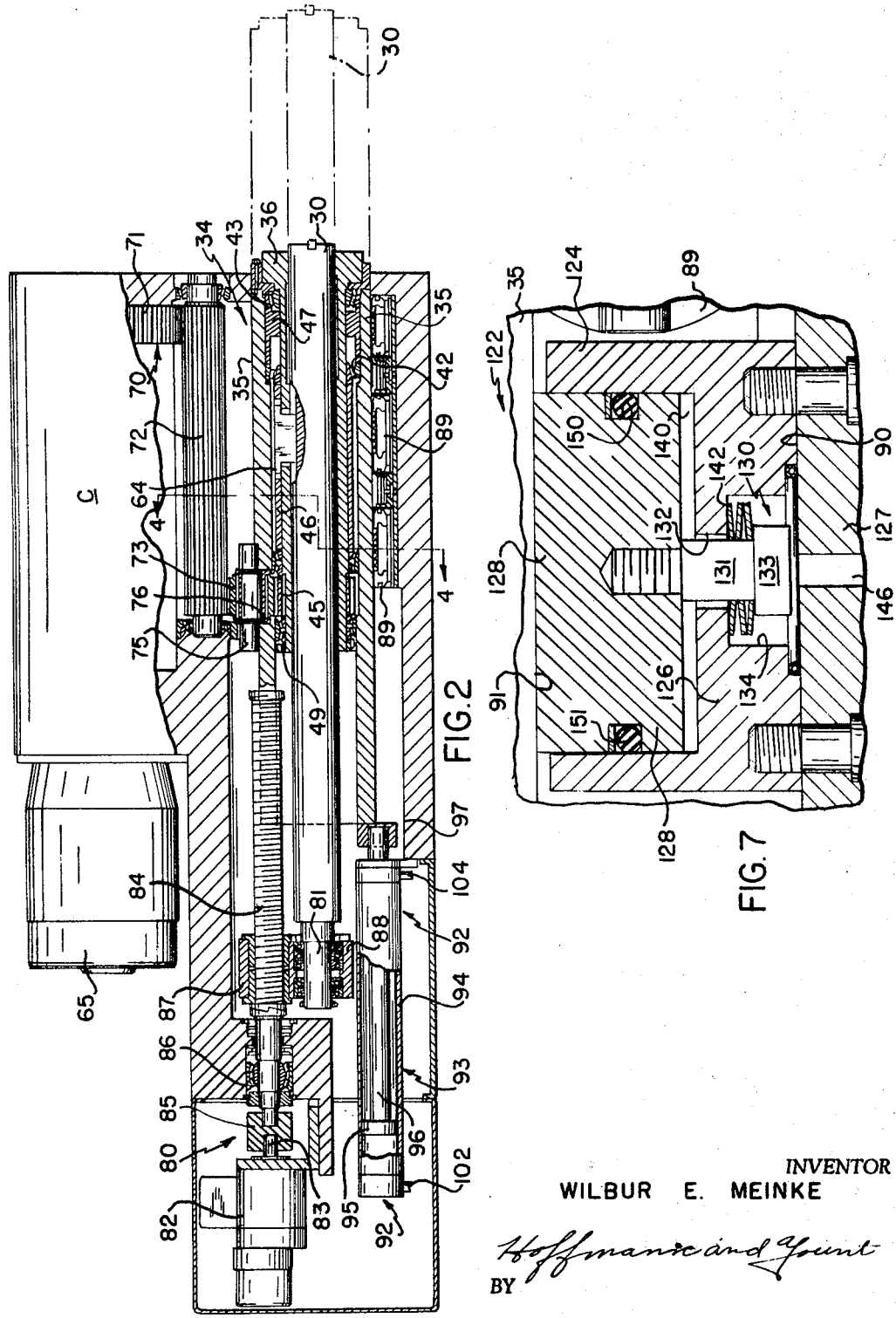
FIG. 2 is a fragmentary sectional view, with portions in elevation, taken approximately on the line 2—2 of FIG. 4.
Figure 3:
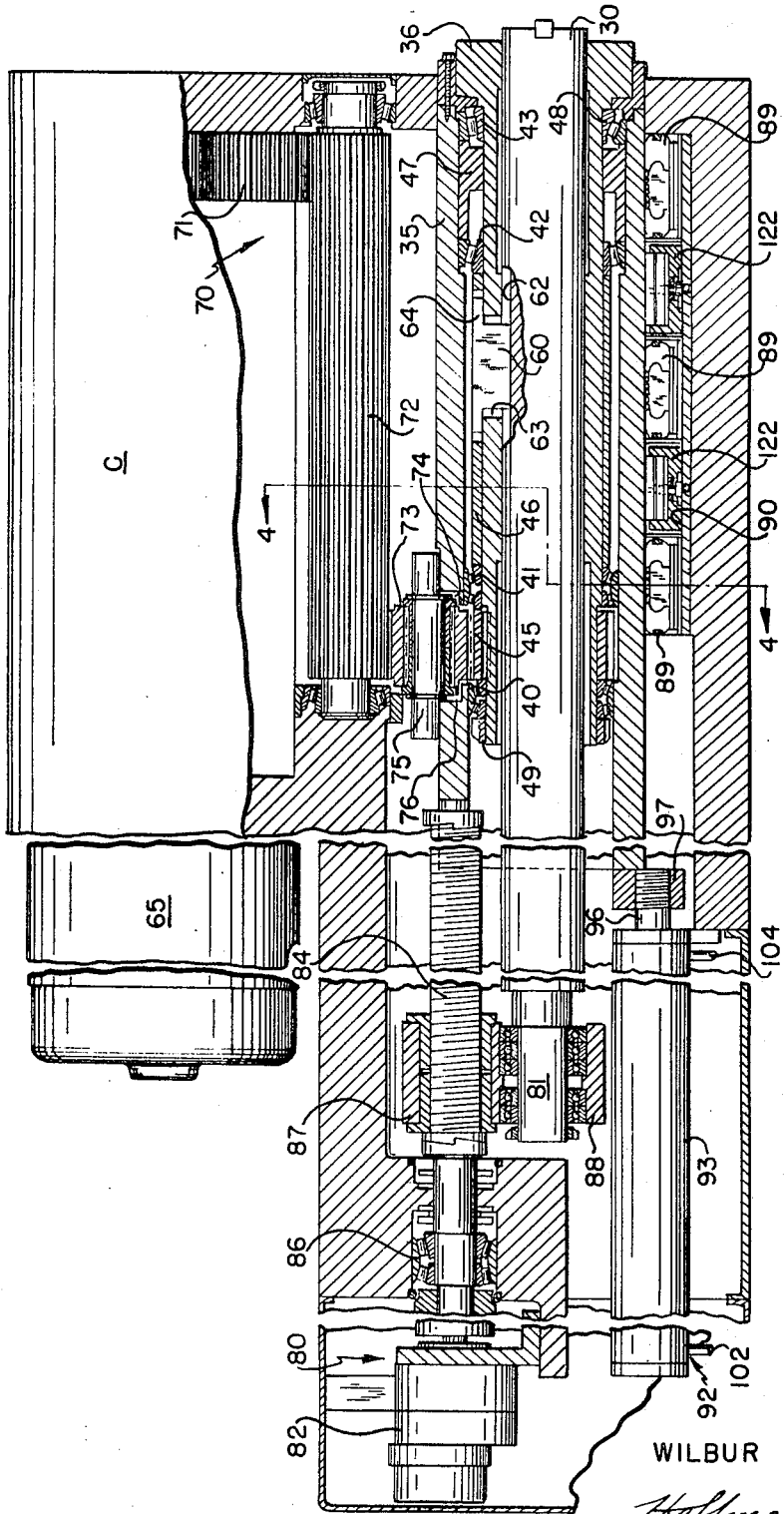
FIG. 3 is an enlarged fragmentary view of FIG. 2.

As previously mentioned, relative axial movement between the inner and outer sleeve 35 and 36 is prevented. To this end, the outer race 50 of the forwardmost bearing 43 is provided with an annular radially extending flange 51 which is received within a counterbore 52 at the forward end of the outer spindle sleeve 35. The outer race 50 of the bearing 43 is retained against the bottom of the counterbore 52 of the outer sleeve 35 by an axially extending annular flange 53 of a retainer ring 54 bolted to the forward end face of the sleeve 35. When the outer sleeve 35 is moved to an extended position or toward the right, as shown in FIG. 2, the engagement between the bottom of the counterbore 52 and the radially extending flange 51 of the bearing 43 causes the latter to be moved toward the right. Movement of the bearing 43 toward the right, due to the engagement between the inner race of the bearing 43 and the shoulder 48 on the sleeve 36, causes the inner sleeve 36 to be moved toward the right with the outer sleeve 35. When the outer sleeve 35 is moved to a retracted position or toward the left, as viewed in FIGS. 2 or 3, the axially extending flange 53 engages the outer race 50 of the bearing 43. The force imposed against the outer race 50 of the bearing 43 is transmitted through the sleeve 47 to the bearing 42 and from the bearing 42 through the sleeve 46, bearing 41, ring gear 45 and bearing 40 to the retainer ring 49 to cause the inner sleeve 36 to be moved toward the left with the outer sleeve 35.

The inner spindle sleeve 36 to which the gear 45 is drive key is drivingly connected with the spindle 30 by a drive key 60 carried by the sleeve 36 and which is slidably received within a longitudinally extending keyway 62 in the spindle 30. The drive key 60 extends through a slot 63 in the sleeve 36 and has a pair of oppositely extending flanges 64 which are bolted to the sleeve 36.

The tool spindle 30 is adapted to be rotated from a reversible electric motor 65 mounted on the spindle head C through the medium of a speed change gear transmission, generally designated by reference character 70, housed within the upper portion of the spindle head C. The speed change gear transmission 70 may be of any suitable type, such as the speed change gear transmission for rotating the tool spindle in applicant's copending application, Ser. No. 400,111, filed Sept. 29, 1964, and includes an output gear 71 which is in constant mesh with the front or right-hand end of a wide faced gear 72 extending parallel to the spindle 30 and having its ends rotatably supported by suitable bearings in the spindle head C. The gear 72 is in constant mesh with a gear 73, the gear 73 in turn being in constant mesh with the ring gear 45 keyed to the inner spindle sleeve 36. The gear 73 is keyed to an annular bearing sleeve or hollow shaft 74 which in turn is rotatably journaled on a stub shaft or member 75 whose opposite ends are bolted or otherwise secured to the outer sleeve 35. The gear 73 projects through a slot or aperture 76 in the outer sleeve 35 adjacent the inner end of the outer sleeve 35. The splined connection between the wide-faced gear 72 and the gear 73 is such as to maintain a drive connection between the gears 72, 73 when the outer sleeve 35 is moved to an extended position or toward the right, as viewed in FIG. 2.

From the foregoing, it is apparent that rotation of the output gear 71 of the speed change gear transmission 70 causes the wide faced gear 72 to be rotated which in turn causes the spur gear 73 to be rotated. Rotation of the spur gear 73 causes the inner sleeve 36 to rotate relative to the outer sleeve 35 which in turn causes the spindle 30 to be rotated due to the key connection between the inner sleeve 36 and the spindle 30.

Figure 5:
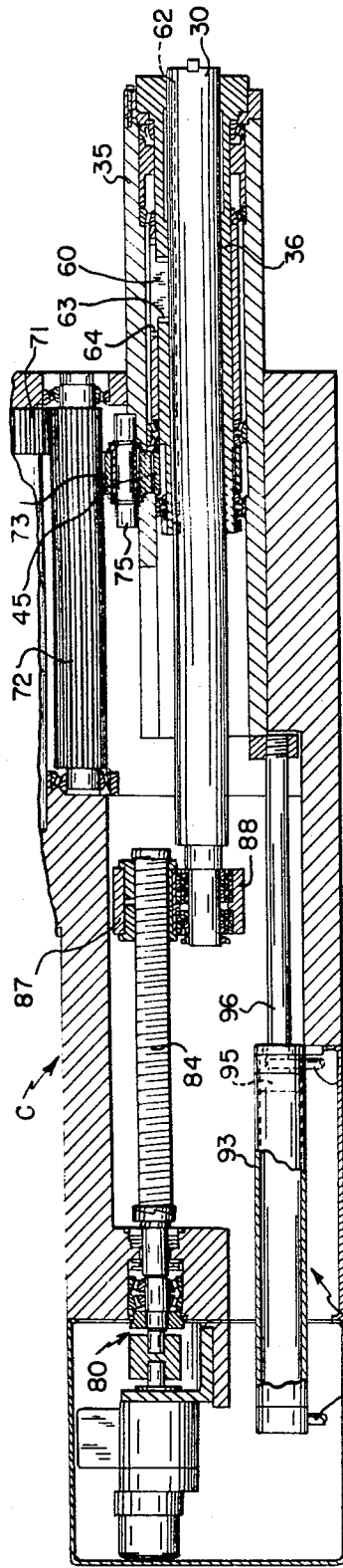
FIG. 5 is a fragmentary sectional view, with portions in elevation, taken approximately on a line 5—5 of FIG. 4 and showing parts in a different position from that shown in FIG. 2.

The tool spindle 30 is movable longitudinally of its axis relative to the inner sleeve 36 and the spindle head C between an inner retracted position, as shown in FIG. 2, and a desired extended working position, such as the extended position shown in FIG. 5, by a power actuated mechanism 80 operatively connected with its rearward end 81. The power mechanism 80 includes a reversible hydraulic motor 82 mounted within the left end of the spindle head C and which has an output shaft 83 which is drivingly connected with one end of a spindle feed screw 84 via a coupling 85. The feed screw 84 is rotatably supported within the spindle head C by a bearing means 86 and is threadably engaged with a nut 87 which is fixed to an other race of a bearing means 88, the inner race thereof being fixed to the inner end 81 of the spindle 30. The bearing means 88 supports the free end of the feed screw 84 through the nut 87 and enables the spindle 30 to be rotated relative to the nut 87.

When the spindle 30 is axially moved relative to the sleeve 36 to an extended working position, the inner and outer sleeves 36 and 35 are moved outwardly relative to the spindle head C to surround the overhanging or outwardly projecting portion of the spindle, as shown in FIG. 5, and support the same during the machining operation. The support provided by the double sleeve arrangement of the support means 34 prevents or significantly reduces deflection of the overhanging portion of the spindle due to the weight thereof, the weight of the tool carried thereby and the load imposed thereon and therefore, affords a significant increase in the accuracy of the machining operations which are performed.

The outer support sleeve 35 is slidably supported in a spindle head C by a plurality of longitudinally and circumferentially spaced anti-friction bearings 89 mounted on longitudinally extending surfaces 90 on the spindle head C spaced circumferentially around the support sleeve 35. The bearings 89, in the preferred embodiment, are located at four circumferentially spaced locations about the support sleeve 35 and at three longitudinally spaced locations along its length. The outer support sleeve 35 has flat or planar portions extending longitudinally of the support sleeve 35 which provide flat surfaces 91 for engagement with the bearings 89. The bearings 89 can be of any suitable or conventional construction, but preferably comprise a housing having a plurality of rollers which move in an endless path in the housing and which rollingly engage the flat surfaces 91 of the sleeve 35 and can be of the type shown in U.S. Patent 3,003,828 or manufactured by the Scully Jones and Company, Chicago, Ill. and shown in Catalog No. 22–62 printed Apr. 1, 1962.

The outer support sleeve 35 is adapted to be moved relative to the spindle head C between extended and retracted positions by a power actuated mechanism 92. The power actuated mechanism 92 comprises a double acting reciprocating fluid motor 93 supported within the spindle head C and operatively connected with the inner end of the spindle sleeve 35. The fluid motor 93 comprises a cylinder 94 having closed end walls and a piston 95 slidably received therein. The piston 95 is rigidly connected to one end of a piston rod 96 which projects through an aperture in the end wall of the cylinder 94 adjacent the spindle sleeve 35. The piston rod 96 at its other end is threaded and is threadably connected to a member 97 fixedly connected with the adjacent end of the outer spindle sleeve 35.

The fluid motor 93 is adapted to be supplied with hydraulic fluid under pressure from any suitable source and a conventional solenoid operated four way valve (not shown) is employed to control the flow of fluid to and from the fluid motor 93. The solenoid operated valve is connected to the opposite ends of the fluid motor by combined delivery and return conduits 102 and 104 and operates as a reversing valve for the flow of fluid to and from the opposite ends of the fluid motor 93. The valve includes actuating solenoids selectively energizable for producing the flow reversing function of this valve. The fluid return from the motor is exhausted to a suitable sump through the valve.

Pressure fluid is normally supplied to the motor 93 in the direction to maintain the outer sleeve 35 in its retracted position, that is, through conduit 104 and exhausted through conduit 102. To move the outer spindle sleeve 35 outwardly relative to the spindle head C to surround the projecting or overhanging portion of the spindle 30 to support the same, the fluid control valve is reversed to supply pressure fluid via conduit 102 to the left end of the cylinder 94, as viewed in the drawings. The supply of pressure fluid to the left end of the cylinder 94 will cause the piston 95 and the piston rod 96 to move toward the right and exhaust the fluid contained in the right end of the cylinder to the sump via conduit 104. Movement of the piston 95 toward the right will cause the outer spindle sleeve 35 to be moved outwardly relative to the spindle head C toward its extended position.

Figure 4:
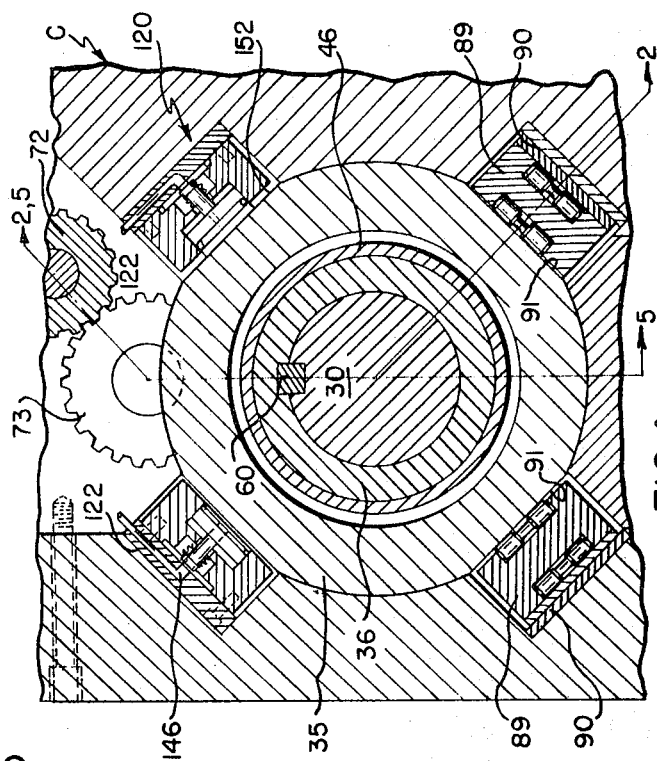
FIG. 4 is an enlarged fragmentary sectional view taken approximately on the line 4—4 of FIGS. 2 and 3.
Figure 6:
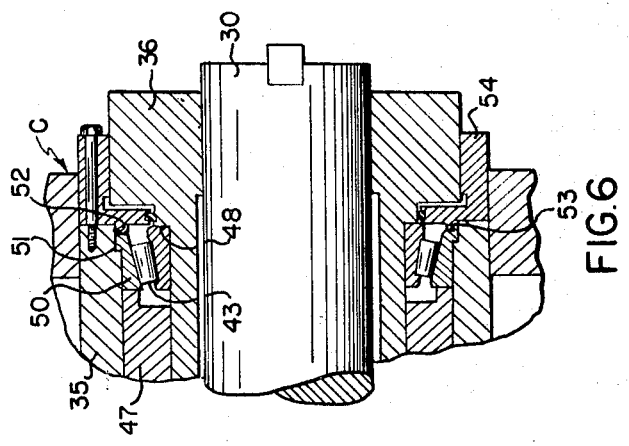
FIG. 6 is an enlarged view of the right-hand portion of FIG. 3.

To move the outer spindle sleeve 35 from an extended position to its retracted position, as shown in FIG. 2, the fluid control valve is reversed and pressure fluid supplied by a conduit 104 to the right end of the cylinder 94, as viewed in FIG. 4. Supplying pressure fluid to the right end of the cylinder 94 will cause the piston 95 and the piston rod 96 to move toward the left and exhaust the fluid from the left end of the cylinder 94 to the sump via a conduit 102. Movement of the piston 95 toward the left causes the outer sleeve 35 to be moved inwardly relative to the spindle head C toward its retracted position.

The outer sleeve 35 may be selectively clamped to the spindle head C by a clamping means 120 to prevent relative movement therebetween during the machining operation. The clamping means 120 comprises a plurality of hydraulically actuated quill clamps 122 supported by the surface 90 on the spindle head C at locations spaced axially of and circumferentially about the outer sleeve 35. Each of the clamps 122 comprises a cylinder 124 having a transverse end wall 126 at one end thereof which is fixed to a surface 90 on the spindle head C. The cylinder 124 is open at its other end, which end terminates adjacent the outer periphery of the sleeve 35, and slidably supports a pitson 128. Threadably secured to the piston 128 is a headed member 130 having a shank portion 131 which projects through an oversized opening 132 in the transverse end wall 126 and a head 133 which is disposed within a recess or counterbore 134 in the end wall 126.

The oversized opening 132 defines a passage for communicating hydraulic fluid from the recess 134 to a chamber 140 formed between the piston 128 and the end wall 126.

The piston 128 is normally biased toward a retracted position in which it is disengaged from the outer periphery of the outer sleeve 35 by a biasing means 142. The biasing means is here shown as comprising a compression spring having one end in abutting engagement with the bottom of the recess 134 and the other end in abutting engagement with the head 133 of the member 130.

The piston 128 has a flat or planar clamping end and is linearly movable from its retracted position toward the outer periphery of the sleeve 35 until it clampingly engages the adjacent flat portion 91 of the latter by supplying hydraulic fluid under pressure to the chamber 140. The hydraulic fluid is supplied from a suitable source via suitable conduits and a combined supply and return passageway 146 in the spindle head C to the recess 134 and flows from the recess around the headed member 130 through the oversized aperture 132 into the chamber 140. The piston 128 has a circumferential groove 150 therein in which a suitable annular seal 151, for example, an O-ring, is disposed to provide a seal between the piston 128 and the cylinder 124.

The outer sleeve 35 is slidably supported by the bearings 89 without looseness, nevertheless the hydraulic fluid supplied to each of the clamps 122 is of an identical pressure so that the outer sleeve 35 always will be centered with respect to the opening in the spindle head in which it is slidably received. Any suitable or conventional means including pressure control means may be employed for supplying hydraulic fluid at the same pressure to each of the clamps 122, and since it does not per se perform a part of the present invention it has not been illustrated or described.

From the foregoing, it is apparent that there has been provided a novel machine tool having an axially extendible tool spindle rotatably carried by a support means also extendible for preventing deflection of the spindle when the latter is moved to an extended working position whereby inaccuracies when machining a workpiece due to deflection of the overhanging portion of the spindle are eliminated or substantially eliminated.

While the preferred form of the invention has been described in considerable detail, it will be apparent that the invention is not limited to the construction shown and it is my intention to cover hereby all adaptations, modifications and changes therein which come within the practice of those skilled in the art to which the invention relates and the scope of the appended claims.

Having described my invention, I claim:

1. In a machine tool; a spindle head; sleeve means slidably supported by said spindle head for linear movement; a tool spindle carried by said sleeve means for axial and rotatable movements relative to said sleeve means; power drive means for rotating said spindle including a wide faced gear carried in said spindle head, a second gear rotatably supported on said sleeve means in meshing engagement with said wide faced gear, and a third gear operatively connected to said spindle in meshing engagement with said second gear; means operatively connected with said spindle for axially moving said spindle relative to said sleeve means and said spindle head; and means for moving said sleeve means relative to said spindle head.

2. In a machine tool; a spindle head; an outer spindle sleeve slidably and non-rotatably carried by said spindle head; an inner spindle sleeve rotatably supported in said outer sleeve; means for preventing relative axial movement between said inner and outer sleeves; a tool spindle mounted in said inner sleeve for axial movement relative thereto; said inner sleeve being slidably keyed with said spindle to provide a drive connection therebetween; power drive means for rotating said spindle including a wide faced gear carried in said spindle head, a shaft fixed on said outer sleeve, a second gear rotatably supported on said shaft in meshing engagement with said wide faced gear, and a ring gear fixed to said inner sleeve in meshing engagement with said second gear; means operatively connected with said spindle for axially moving said spindle relative to said sleeves and said spindle head; and means for moving said inner and outer sleeves relative to said spindle head.

3. In a machine tool as claimed in claim 2, including selectively actuatable clamping means carried by said spindle head for clamping said outer sleeve to said spindle head to prevent movement therebetween during a machining operation.

References Cited

UNITED STATES PATENTS

| | | | |
|---|---|---|---|
| 2,284,758 | 6/1942 | Morton et al. | 77—3 |
| 3,259,020 | 7/1966 | Walker | 90—11.1 |
| 2,250,594 | 7/1941 | Morton | 77—3 |

FOREIGN PATENTS

| | | |
|---|---|---|
| 848,533 | 9/1960 | Great Britain. |
| 899,497 | 6/1962 | Great Britain. |

FRANCIS S. HUSAR, Primary Examiner

U.S. Cl. X.R.

77—3

PO-1050
(5/69)

UNITED STATES PATENT OFFICE
CERTIFICATE OF CORRECTION

Patent No. 3,455,207          Dated     July 15, 1969

Inventor(s)       W. E. Meinke

It is certified that error appears in the above-identified patent and that said Letters Patent are hereby corrected as shown below:

Column 3, line 63, "drive key" should be --keyed--.

Column 4, line 42, "other" should be --outer--.

SIGNED AND
SEALED
JAN 27 1970

(SEAL)
Attest:

Edward M. Fletcher, Jr.
Attesting Officer

WILLIAM E. SCHUYLER, JR.
Commissioner of Patents